Nov. 13, 1956 G. W. SJOBOEN Re. 24,237

OVERHEAD DOOR STRUCTURE

Original Filed Jan. 11, 1954 2 Sheets-Sheet 1

INVENTOR.
GEORGE W. SJOBOEN
BY
Barnes, Kisselle, Raughlin & Laisch
ATTORNEYS

OVERHEAD DOOR STRUCTURE

Original Filed Jan. 11, 1954 2 Sheets-Sheet 2

INVENTOR.
GEORGE W. SJOBOEN
BY
Barnes, Kisselle, Raugklin & Raisch
ATTORNEYS

United States Patent Office

Re. 24,237

Reissued Nov. 13, 1956

24,237

OVERHEAD DOOR STRUCTURE

George W. Sjoboen, Birmingham, Mich., assignor to Steel Door Corporation, Pontiac, Mich., a corporation of Michigan Original No. 2,741,806, dated April 17, 1956, Serial No. 403,265, January 11, 1954. Application for reissue May 17, 1956, Serial No. 585,598

11 Claims. (Cl. 20—19)

Matter enclosed in heavy brackets [ ] appears in the original patent but forms no part of this reissue specification; matter printed in italics indicates the additions made by reissue.

This invention relates to door supporting and stabilizing structure which is especially adapted for use in overhead, receding type garage doors.

When an overhead type door is closed with its door panel in vertical position, the weight of the panel bearing on supports at its upper corners plus the confining effect of the door framing operate to stabilize the door panel against lateral movement. When the door is opened the panel moves upwardly, its upper edge recedes away from the doorway, usually on rollers which are supported by tracks suspended within the building, and its lower portion rides upwardly on support arms pivoted on the door frame.

When the panel approaches a horizontal position substantially all of its lateral stability is provided by the inherent rigidity of the support arm structure. In prior structures there has been insufficient rigidity to prevent the panel from wobbling and bumping against the sides of the door frame during opening and closing of the door. Such wobbling and bumping is itself an annoyance and in time the door panel and frame become marred and unsightly.

It is an object of this invention to provide a simple, inexpensive overhead door structure having sufficient lateral stability to prevent the door panel from bumping against the door frame during opening and closing of the door. A further object of the invention is to include in the door structure convenient means for adjustably positioning the door panel within its frame. One form of the invention is shown in the accompanying drawings.

Figure 1:
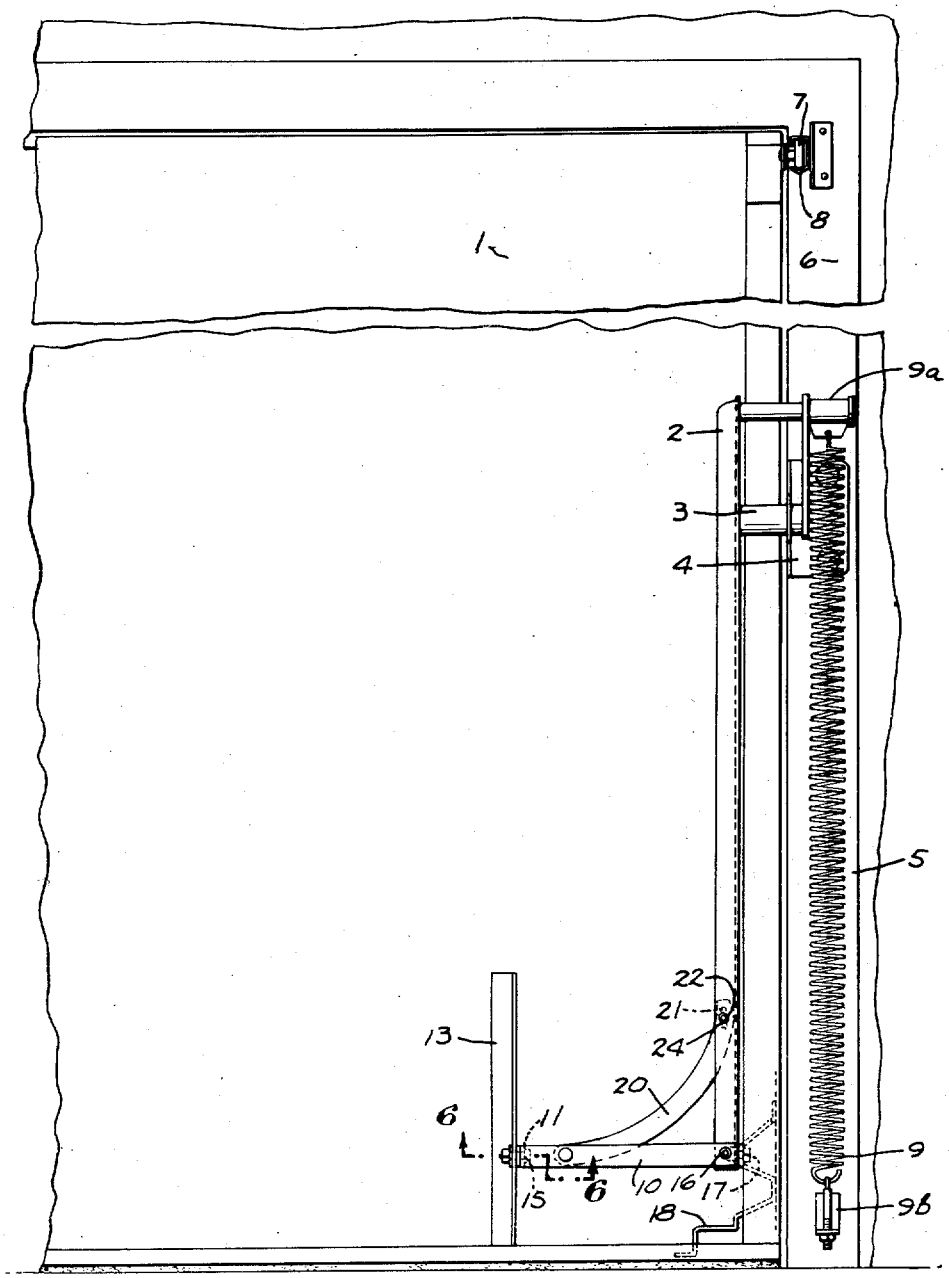
Fig. 1 is an elevational view showing a door made in accordance with this invention mounted in a doorway.
Figure 2:
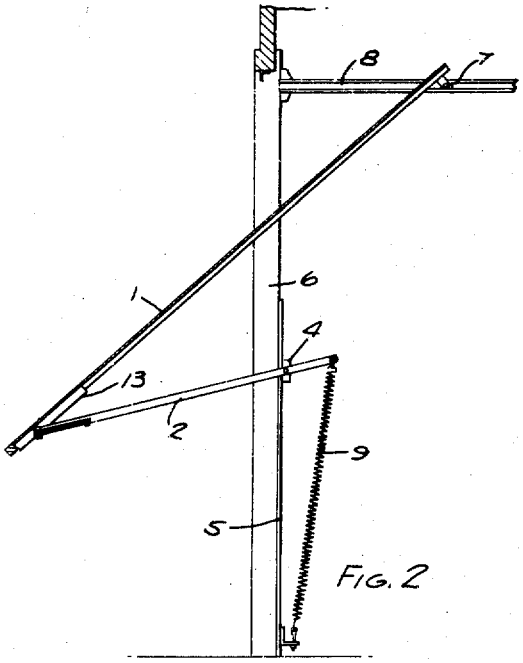
Fig. 2 is a digrammatic view showing the door in partly open position.

The door shown in the drawings has a body 1 supported at each side by a support arm 2 mounted for swinging movement by means of a pivot 3 journalled in a bracket 4 which is mounted on a frame 5 in turn secured to the door jamb 6 of a building. Mounted at the top of each side of the door panel 1 is a roller 7 carried by a track 8 suspended by suitable means within the building. A counterbalance spring 9 is connected between the upper end of each support arm 2 as at 9a and frame member 5 as at 9b. The door panel, at each side near its lower end, is provided with a bearing stud 17 which extends inwardly and which may be mounted on the door by means of a bracket 18. Each arm 2 has an opening 19 for fitting over the bearing stud 17.

Figure 6:
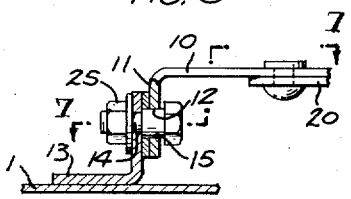
Fig. 6 is a view partly in section taken on line 6—6 of Fig. 1.
Figure 7:
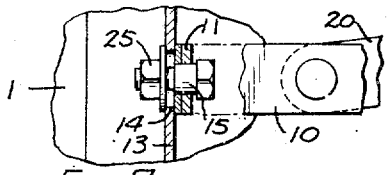
Fig. 7 is a view taken on line 7—7 of Fig. 6.

One end of a bearing arm 10 is pivotally secured, as by means of a rivet or the like, to the lower end of each support arm 2, as at 16, and at the other end of each bearing arm is a laterally extending portion 11 having an opening 12 therein. Near each side of the door panel 1 is a rib 13 with an elongated opening 14 therein. The door panel is pivotally connected to the bearing arms 10 by shoulder bolts 15 extending through openings 12 and 14 (Figs. 6 and 7), the bearing arms lying substantially on a common axis.

One end of a stabilizing element 20 is pivotally riveted to an intermediate portion of each bearing arm 10 and each stabilizing element has an elongate aperture 21 at its other end. Each stabilizing element 20 is adjustably secured to a support arm 2 by a bolt 22 extending through the aperture 21 and through an opening 23 (Fig. 3) in the support arm.

Figure 4:
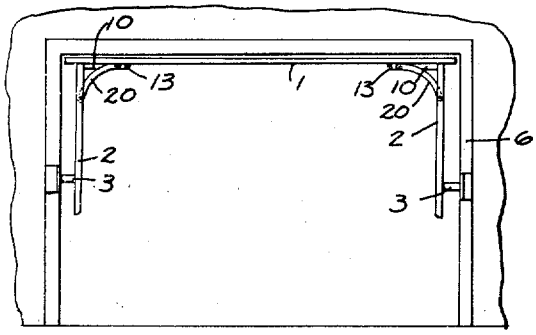
Fig. 4 is a diagrammatic view illustrating the door in open position.
Figure 5:
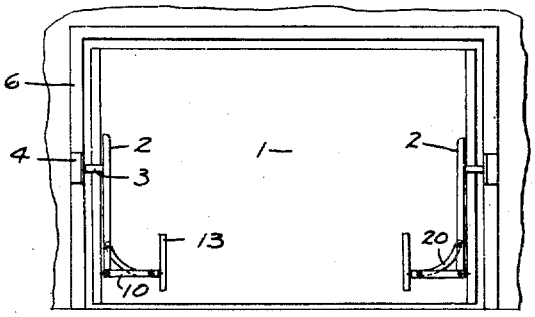
Fig. 5 is a diagrammatic view illustrating the door in closed position.

In mounting the door, the rollers are placed in the overhead tracks. The lower end of the door is pivotally connected to the arms 2 by the studs 17, and the counterbalance springs are connected as shown. The connections between the stabilizing elements 20 and the arms 2, and between the bearing arm 10 and the rib 13 are preferably allowed to remain loose. It is preferable then to swing the door to open position, as shown in Fig. 4. It may be found at this time that the door is not properly centered. This may be due to such factors as inaccuracies in the building construction, inaccurate placement of the frame members 5 on the building construction or variations in door parts normally incident to their manufacture.

The door panel may now be straightened or centered by the shifting of the elongated slots 21 of the stabilizing elements relative to their securing bolts and when the door is centered nuts 24 on the bolts 22 are tightened. In this adjustment there is a slight relative shifting of the door relative to the supporting arms 2 with pivotal action of the bearing arms 10 about their mountings 16. It is then preferable to move the door to partially closed position leaving the shouldered bolts 15 loosely mounted in the elongated slots 14 which extend in an up and down direction. In this partial closing of the door the bolts 15 may shift in their elongated openings and nuts 25 thereon are then tightened. This fixes the triangular reinforcing or stabilizing structure at the opposite lower ends of the door panel. It might be said that the stabilizing feature is of most importance and performs its principal function in that range of movement from full open position to partial open position of the door; this partial opening is about the one-half way position.

Figure 3:
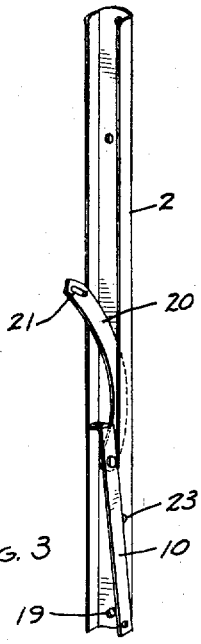
Fig. 3 illustrates some of the parts separate from the door panel and showing a folded condition.

In the normal operation of the door to and from open and closed positions there is a pivotal action of the studs 17 in the openings 23 of the supporting arms, and similarly a pivotal action of the shouldered bolts 15 in the ends of the bearing arms 10. Thus the door is pivotally connected at spaced points by a rigid truss or gusset structure and is held strongly stabilized against lateral movement, particularly from about one-half way open position to full open position. Thus objectionable wobbling of the door in its operation is largly eliminated. The stabilizing elements 20 are preferably curved or bowed, as shown, so that in open position, as illustrated in Fig. 4, the head room or clearance at the upper corners of the doorway is not materially reduced. The supporting arm 2, the bearing arm 10 and the truss or stabilizing element 20 on each side of the door, may be folded somewhat as indicated in Fig. 3 to facilitate shipment. The stabilizing structure is effective through the whole range of movement of the door though especially effective in partially open position as described.

I claim:

1. An overhead door structure comprising, means forming a frame adapted to be secured to jambs defining a doorway, a door panel, support means supporting the door panel on the frame, said support means including at each side of the door panel a support arm secured on said frame by a first pivot and secured adjacent a lower edge portion of said panel by a second pivot spaced from the first, said pivots having generally horizontal axes to facilitate swinging said panel in a vertical direction to open and closed positions, a bearing arm rotatably secured on said support arm and extending laterally thereof in operative position, a stabilizing element extending angularly between said arms, said bearing arm being pivoted on the door panel generally coaxially with said second pivot, one end of the stabilizing element being rotatably mounted on one of said arms and the other end being shiftably secured to the other arm whereby to adjust the position of the door panel relatively to the frame, and means securing the stabilizing element rigidly to said arms when the door panel is properly positioned.

2. In an overhead door structure, the combination of a pivotally mounted supporting arm, a door panel, means pivotally connecting the lower portion of the panel to the arm, whereby pivotal movement of the arms shifts the lower portion of the door from lower closed position to upper open position, a bearing arm pivotally secured to the supporting arm on an axis at a right angle to the pivotal connection between the supporting arm and door panel, said bearing arm extending inwardly of the door panel, a pivotal connection between the inner end of the bearing arm and the door panel on an axis generally coinciding with the axis of connection between the supporting arm and door panel, said pivotal connection being shiftable generally in the plane of said door panel for adjusting the position of said bearing arm, a stabilizing element extending across the angle formed by the supporting arm and the bearing arm, means pivotally connecting the stabilizing element to one arm on an axis substantially parallel to the first mentioned axis, means slidably connecting the stabilizing element to the other arm, means operable to fix said stabilizing element rigidly on said arms, and means operable to fix said pivotal connection in adjusted position.

3. In an overhead door structure of the type wherein a door panel is mounted adjacent its lower edge on vertically swinging support arms, a stabilizing structure for the lower edge of the door which comprises, a bearing arm connected to and extending laterally of each support arm and being attached to said door panel in a pivot, said pivots being shiftable for adjusting the positions of said bearing arms, a stabilizing element extending across the angle formed by said support arm and bearing arm and being shiftably attached thereto, whereby to adjust the relative positions of the support arms and door panel, means operable to secure said stabilizing members rigidly to said support arm and bearing arm, and other means operable to fix said pivots in adjusted relation.

4. A door structure comprising, means forming a frame adapted to be secured to members defining a doorway, a door panel, support means supporting the door panel on the frame, said support means including at opposite sides of the door panel a support arm, first pivot means connecting each support arm to said frame, second pivot means connecting each support arm to said panel, said first and second pivot means being spaced from each other, a bearing arm rotatably secured on said support arm and extending laterally thereof in operative position, means forming a pivotal connection between said bearing arm and said door panel, said pivotal connection being shiftable for adjusting the relative positions of said bearing arm and said door panel, a stabilizing element extending angularly between said bearing arm and support arm, means rotatably mounting said stabilizing element on one of said arms and means shiftably securing said stabilizing element to the other of said arms, whereby to adjust the position of said door panel relatively to said frame, and means operable to secure said stabilizing element rigidly to the last mentioned arm when said door panel is properly positioned.

5. The door structure defined in claim 4 wherein said door panel is provided adjacent each lower corner with a vertically extending rib with vertical slotted means therein, the pivotal connection of said bearing arm and rib including means engaging in said slotted means so that said pivotal connection can be adjusted vertically.

6. The door structure defined in claim 5 wherein said means engaging in said slotted means is operable to fix said pivotal connection in adjusted position.

7. A door structure comprising, frame means adapted to be secured to jambs defining a doorway, a door panel, a pair of support arms at opposite sides of said panel, said support arms being pivoted on said frame means and being pivoted on said door panel adjacent its lower edge, the axes of the pivots being generally horizontal so that said door panel can be swung vertically to open and closed positions, a bearing arm pivoted on the lower end of each support arm for swinging in a plane generally parallel to the plane of the door panel, said door panel having adjacent each lower corner a generally vertically extending rib, said ribs being vertically slotted, each bearing arm having an inner end connected to said rib through pivot means, the axis of said pivot means being generally parallel to the axes of the first-mentioned pivots, means on said pivot means shiftably engaging within the slots in said ribs so that the inner ends of said bearing arms can be vertically shifted for adjusting the alignment of said bearing arms, said means on said pivot means being operable to fix said bearing arms in adjusted position, a stabilizer pivoted on each bearing arm for swinging generally parallel with the plane of said door panel, means slidably securing each stabilizer on a support arm, so that said stabilizer can be shifted for adjusting the relative positions of said door panel, support arms and frame, means operable to fix said stabilizer in adjusted position, said stabilizers having a relatively smaller thickness and relatively greater width in the plane of said door panel to provide rigid support for said structure.

8. A door structure of the type defined in claim 4 wherein one end of said stabilizing element is pivoted on said bearing arm and the other end of said stabilizing element is shiftably secured to the support arm.

9. The door structure defined in claim 4 wherein said stabilizing element is bowed toward the edges of the door panel to increase doorway clearance while maintaining the efficacy of said stabilizing element.

10. The door structure defined in claim 4 wherein said stabilizing element is substantially rigid, having a relatively greater width and a relatively smaller thickness, said stabilizing element being disposed so that its width dimension lies generally parallel to the plane of said door panel.

*11. In an overhead door structure of the type wherein a door panel is rotatably mounted on support arms which swing to generally vertical upward and downward positions for opening and closing the door, stabilizing structure for the door which comprises, a brace structure attached to said door panel adjacent each side through means including a pivotal bearing connection disposed generally on the axis of rotation of said support arms relatively to said door panel, each brace structure having at least two spaced apart connections to one of said support arms, one of which is a pivotal connection and the other of which is a shiftable connection, so that said brace structure can be swung about said pivotal connection to selected positions relatively to said support arm for centering said door panel in a doorway, means operable to lock said shiftable connection to secure said brace structure in adjusted position, said pivotal bearing connections being shiftable relatively to said door panel in a plane*

*generally parallel to the plane of the door panel for adjusting the positions of said pivotal bearing connections with respect to the axis of rotation of said support arms on said door panel, and means operable to fix said pivotal bearing connections in adjusted relation.*

References Cited in the file of this patent or the original patent

UNITED STATES PATENTS

| | | |
|---|---|---|
| 2,170,295 | Ferris | Aug. 22, 1939 |
| 2,213,230 | St. Johns, Jr. | Sept. 3, 1940 |
| 2,259,819 | Holmes | Oct. 21, 1941 |
| 2,324,138 | D'Alfonso | July 13, 1943 |
| 2,425,905 | Violante | Aug. 19, 1947 |